United States Patent [19]

Koseki

[11] Patent Number: 4,646,310
[45] Date of Patent: Feb. 24, 1987

[54] FLOW CONTROL DEVICE FOR A LASER GENERATOR

[75] Inventor: Ryoji Koseki, Buena Park, Calif.
[73] Assignee: Amada Engineering Service Co., Inc., La Mirada, Calif.
[21] Appl. No.: 817,053
[22] Filed: Jan. 8, 1986
[51] Int. Cl.[4] ............................................. H01S 3/22
[52] U.S. Cl. ........................................ 372/58; 372/65
[58] Field of Search ............................ 378/58, 55, 108; 372/65, 107

[56] References Cited

U.S. PATENT DOCUMENTS 4,564,947 1/1986 Daniel .................................... 372/58

Primary Examiner—Léon Scott, Jr.
Attorney, Agent, or Firm—Wigman & Cohen

[57] ABSTRACT

A flow control device in a laser generator has a flow control valve disposed opposite a ring member to form an orifice. Laser gas flows from an inlet port into the flow control device, through the orifice, through the flow control valve and into the laser tube. The flow control valve is moveable axially toward and away from the ring member to vary the orifice to control the flow of laser gas in the laser tube. The laser tube also has a sub-hole for a sub-flow of laser gas in the laser tube. A throttling valve is disposed in the flow control device to throttle the flow of laser gas in the sub-hole.

15 Claims, 16 Drawing Figures

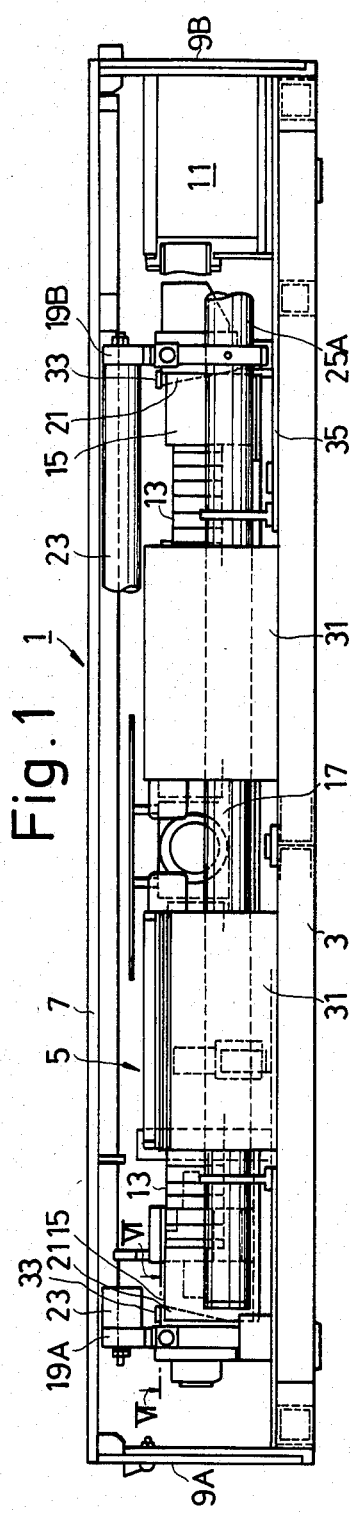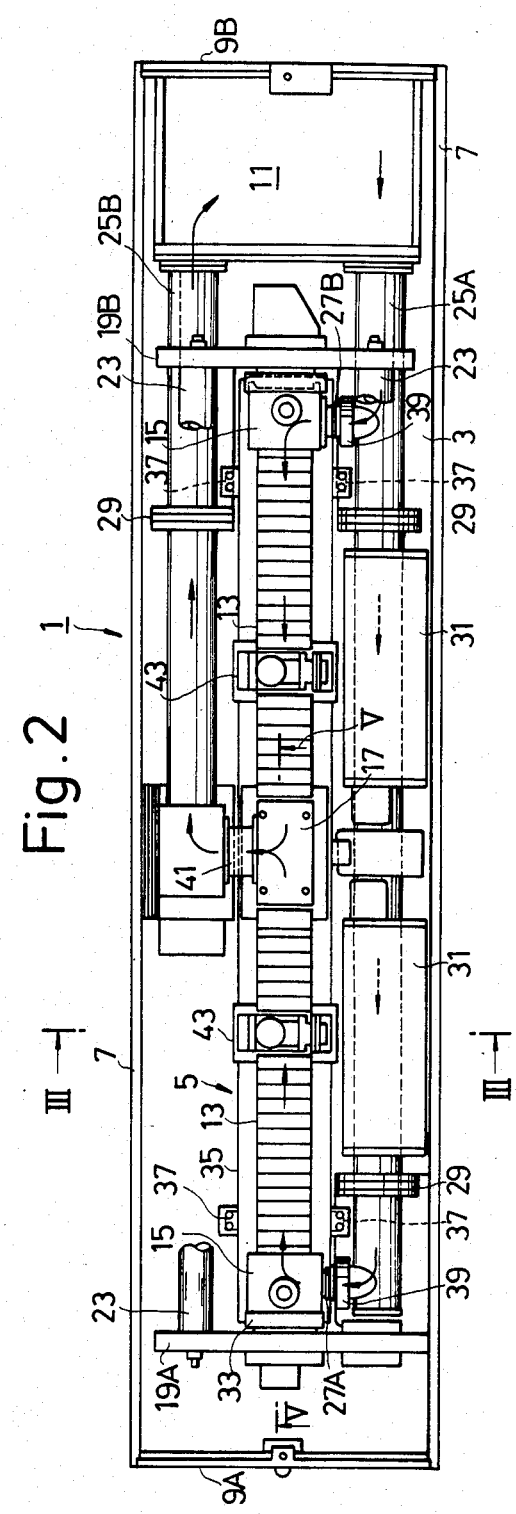

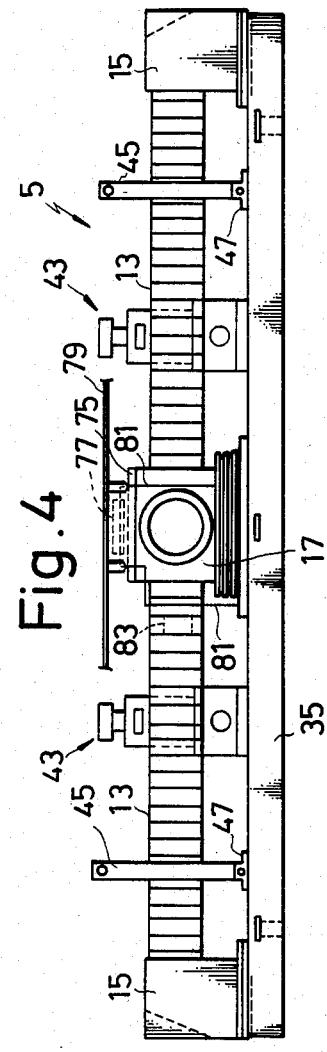
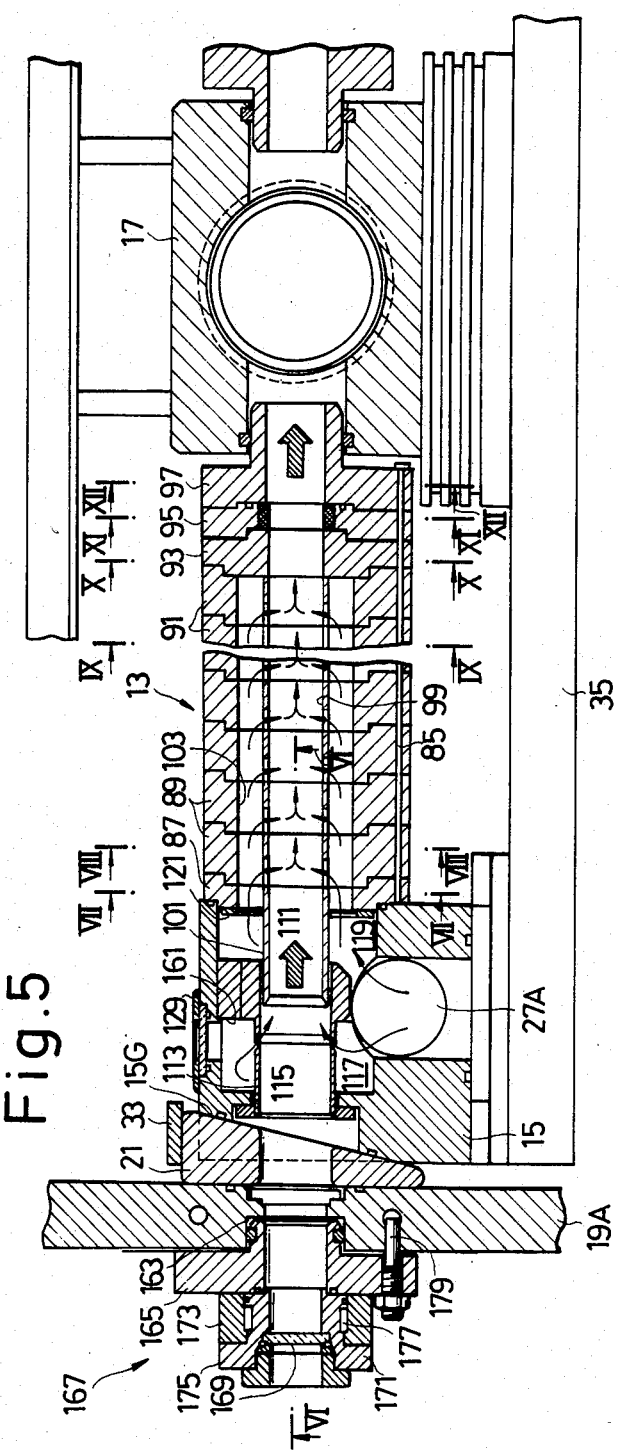
Fig. 4
Fig. 5

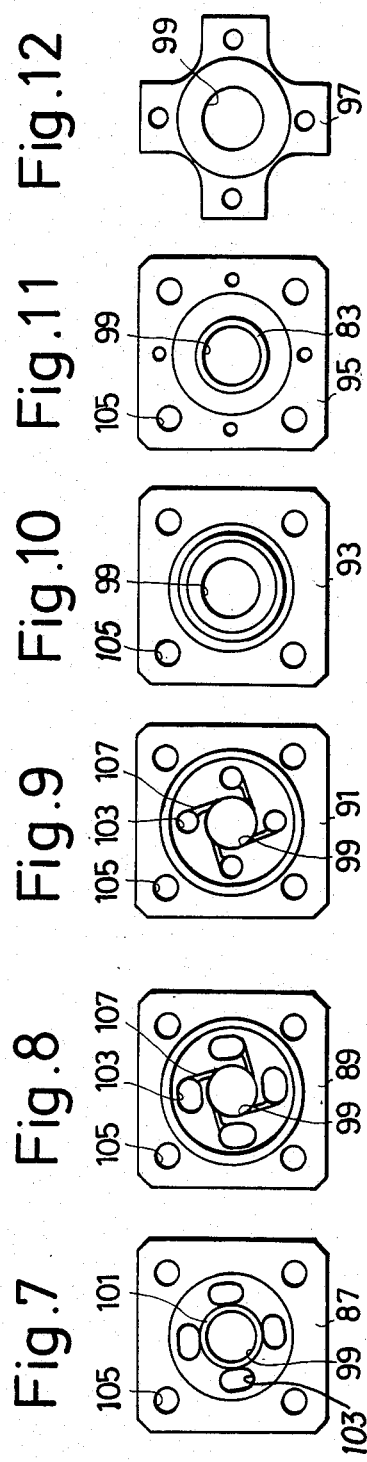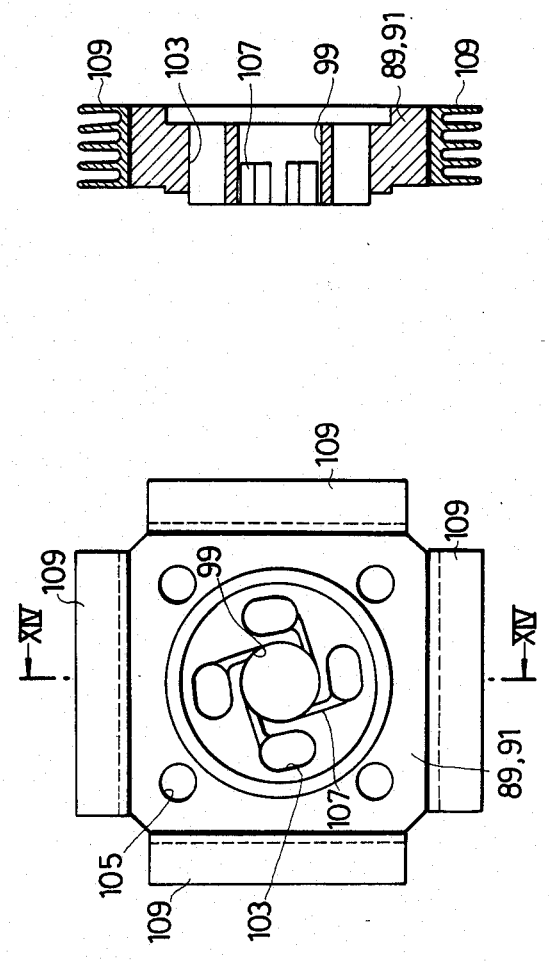

FLOW CONTROL DEVICE FOR A LASER GENERATOR

BACKGROUND OF THE INVENTION

1. Field of the invention

The present invention relates to a laser generator used in a laser processing machine, and in particular to a flow control device which adjusts the flow of laser gases in a laser generator.

2. Description of the Prior Art

Generally, three types of laser generators are known for use in a laser processing machine. These are the high speed axial, biaxial transverse, and triaxial transverse types.

At the present time, with a laser processing machine which uses a high speed axial type of laser generator, the surface roughness of the processed workpiece is inferior in comparison with a workpiece processed in a laser processing machine using a biaxial transverse or triaxial transverse laser generator, because the stability of the output beam (mode stability) is poor.

Various factors are considered to cause this problem, but the main three causes are believed to be turbulence in the laser gases, rippling of the laser current, and rippling of the blower gas pressure. Specifically, the turbulence in the laser gas flow depends on the shape of the laser tube. In conventional laser tubes the injection port for the laser gas is a T-shaped tube so that the laser gas flow must make a right-angled turn and a fluctuation is produced in the flow pattern. It has been observed experimentally that this laser gas flow fluctuation changes over a short time span, and the electric discharge also fluctuates along with the laser gas flow.

In addition, the results of measurements of the degree of surface roughness of an actually processed workpiece have shown a ripple having the same period as the ripple in the electric power source for the laser, indicating that the ripple in the power source has an effect on the degree of roughness of the surface of the workpiece.

Further, the ripple in the blower gas pressure results from the fact that, with the high speed axial type of laser generator, a Rootes blower is generally used. This type of blower is used because the laser gas is flowing at a high speed inside a narrow laser tube so that a high head and high flow volume are required. Because the Rootes blower discharges exhaust gases four times for each rotation of the motor, the production of the ripple in the gas pressure is unavoidable. A change in the impedance of the gas is apparent from the variation of the gas pressure. This fact, coupled with the velocity of the feedback response speed of the power control and its contribution to the variation of the beam output power results in a roughness in the surface of the workpiece from the laser process.

A more detailed consideration of the laser gas flow turbulence stated as the first cause of the roughness of the surface of the workpiece indicates that when a fluctuation in the laser gas flow is produced it is only natural that the electric discharge will also fluctuate. As a result of this fluctuation, a change related to position and time is also produced in the light amplification medium within the laser gases. As a result, when the distribution of the intensity of the output beam is measured by a laser beam analyzer, it is clearly shown that within a short time span there is a positional change. Accordingly, there is a large variation in the intensity distribution in the direction in which the gases are blown up (Y-axis direction) from the lower part to the upper part of the laser tube. In the present state of the art, this causes considerable difficulty because it is not possible to reduce the fluctuations in the flow of the laser gases flowing in the laser tube.

SUMMARY OF THE INVENTION

An object of the present invention is to provide, with due consideration to the drawbacks of such conventional devices, a flow control device for a laser generator in which an increase in the output and a stabilization of the beam is made possible by reducing the fluctuations in the flow of the laser gases within a laser tube, and to provide a homogeneous velocity distribution in the laser gases.

In order to accomplish this object, in a first embodiment of the present invention, a first gas chamber is formed in a flow control unit positioned at one end of a laser tube in a laser generator to communicate with a laser introduction port. One end section of the laser tube is provided facing onto the first gas chamber, and a ring member provided in the first gas chamber and a cylindrical flow controller valve are provided to oppose to each other in the axial direction corresponding to one end of the laser tube. An orifice is formed and provided between the ring member and the flow controller valve to adjust the flow volume of the laser gases going to the laser tube. This configuration provides for freely adjusting the suitable direction of this ring member or the flow control valve in the axial direction. In this configuration, it is highly desirable that the laser tube is formed from ceramic disks laminated and each disk having a main hole and a communication hole.

In this control unit, an inspection window is provided to check the adjustment of the flow control valve. In addition, a dust trap is also provided to exclude dust contained in the laser gases.

In a second embodiment of the present invention, a first and a second gas chamber are formed in a flow control unit positioned at one end of a laser tube in a laser generator to communicate with a laser introduction port. One end section of the laser tube is provided facing onto the first gas chamber, and a ring member provided in the first gas chamber and a cylindrical flow controller valve are provided to oppose to each other in the axial direction corresponding to one end of the laser tube. An orifice is formed between the ring member and the flow controller valve to adjust the flow volume of the laser gases going to the laser tube. It is possible to freely adjust the suitable direction of this ring member or the flow control valve in the axial direction. A communication hole, communicating with a plurality of laser injection holes formed in the longitudinal direction of the laser tube, is formed and communicates with the second gas chamber. A throttling valve is provided to freely adjust this communication hole by throttling.

In this configuration, it is highly desirable that the laser tube is formed from ceramic laminated disks each having a main hole and a communication hole.

A degree-of-opening check unit for checking the adjustment of a sub-flow control valve is provided in this flow control unit.

BRIEF DESCRIPTION OF THE DRAWINGS

These and other objects, features and advantages of the present invention will become more apparent from the following description of a preferred embodiment taken in conjunction with the accompanying drawings, in which:

FIG. 1 is a front elevation of the laser generator of the present invention.

FIG. 2 is the plan view of FIG. 1.

FIG. 4 is a front elevation of the assembled laser tube of the present invention.

FIG. 5 is an enlarged sectional drawing, viewing along the line V—V in FIG. 2.

FIG. 7 is a sectional drawing, viewing along the line VII—VII in FIG. 5.

FIG. 8 is a sectional drawing, viewing along the line VIII—VIII in FIG. 5.

FIG. 9 is a sectional drawing, viewing along the line IX—IX in FIG. 5.

FIG. 10 is a sectional drawing, viewing along the line X—X in FIG. 5.

FIG. 11 is a sectional drawing, viewing along the line XI—XI in FIG. 5.

FIG. 12 is a sectional drawing, viewing along the line XII—XII in FIG. 5.

FIG. 13 is a front elevation of another embodiment corresponding to FIG. 8 or FIG. 9.

FIG. 14 is a sectional drawing, viewing along the line XIV—XIV in FIG. 13.

DESCRIPTION OF THE PREFERRED EMBODIMENTS

Figure 3:
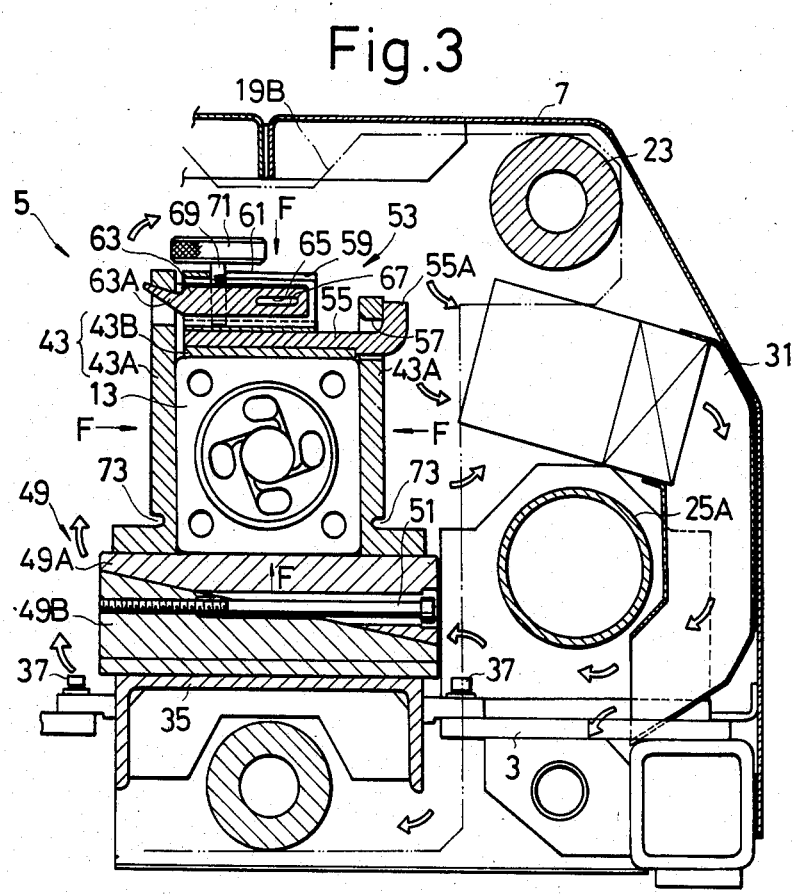
FIG. 3 is an enlarged sectional drawing, viewing along the line III—III in FIG. 2.

Now referring to FIG. 1 and FIG. 2, a laser generator 1 comprises a support frame 3 which generally supports the body of the unit, and a cover 7 which covers a discharge unit 5 and a laser oscillating section of the discharge unit 5. This laser oscillating section is freely removable from the support frame 3. The support frame 3 is framed in a longitudinal form by a plurality of lengths of angle pipe material. A plurality of side plates 9A and 9B are provided which are erected respectively at the left and the right end of the support frame 3. The cover 7 is installed on the sideplates 9A and 9B so that it covers the upper section and the front and back sections of the discharge unit 5.

As is shown in FIG. 1 and FIG. 2, a comparatively large main heat exchanger 11 is provided at the inner side of the side plate 9B erected on the right side of the support frame 3. This main heat exchanger 11 cools the laser gases which are a mixture of helium, nitrogen, and carbon dioxide gases refluxed from the laser oscillation section inside the discharge unit 5.

The main heat exchanger 11 is provided with a curved tube in which flows a cooling medium, such as cooling water, and with a plurality of cooling fins.

The discharge unit 5 forms an integral unit with a flow control unit 15 for controlling a plurality of left and right laser tubes 13 which extend in the left to right direction on a common axis and the flow volume of the laser gases to each laser tube 13, to carry out and amplification of the excitation beam, and with a manifold block 17 connected to the left and right laser tubes 13. A flow control unit 15 is connected to both ends of the left and right laser tubes 13. The flow control units 15 are connected to a plurality of support plates 19A and 19B which are erected in the inner direction of the side plates 9A, 9B on the support frame 3. The discharge unit 5 is installed in a removable manner through a wedge-shaped bracket 21. Specifically, a plurality of inclined channels 15G are formed on the side surfaces opposite the respective support plates 19A, 19B which support the respective flow control units 15, as shown in FIG. 5. The support plates 19A, 19B and the flow control units 15 are removably connected to each other by the wedge shaped bracket 21 engaged under pressure in these inclined channels 15G. The support plates 19A, 19B extend in the front-to-back direction—that is, in a direction transverse to that in which the laser tube 13 extends. The support plates 19A, 19B are integrally connected by a plurality of tie rods 23.

The laser gases are fed into the laser tube 13 which is connected to the main heat exchanger 11 to cool the laser gases which are heated by the electric discharge inside the laser tube.

A gas circulation device (not shown in the drawings) which may be, for example, a blower, pulls in the laser gases cooled inside the main heat exchanger 11 and feeds them to the laser tube 13. This gas circulation device is suitably connected to the main heat exchanger 11.

A pair of connecting tubes 25A and 25B for communication, which are positioned parallel and in close proximity to the laser tube 13, are connected horizontally to the main heat exchanger 11. On one hand the connecting tube 25A is connected to the flow control units 15 which are removably supported on the support plates 19A and 19B, through a plurality of cylindrical coupling members 27A and 27B. On the other hand, the connection tube 25B is connected to the manifold block 17.

The connecting tubes 25A and 25B are supported by a plurality of support blocks 29 which are erected on the support frame 3.

The laser gases which are cooled by the main heat exchanger 11, as shown in FIG. 2, are fed into the respective right and left flow control units 15, in the direction indicated by the arrows, through the connecting tube 25A and the cylindrical coupling member 27A and 27B. The laser gases which are fed into the left flow control unit 15 flow in the direction indicated by the arrows into the laser tube 13 positioned on the left side. The laser gases fed into the flow control unit 15 on the right side flow into the laser tube 13 positioned on the right side, in the direction of the arrows. A positive and a negative electrode (not shown on the drawings) are positioned respectively at a plurality of locations in the laser tubes 13 to produce an electric discharge in the laser gases flowing into the laser tubes 13 positioned in the left-right direction. The laser gases inside the left-to-right laser tubes 15 are made to flow together in the manifold block 17 to cool these laser gases. The laser gases, which are made to flow together in the manifold block 17, flow back into the main heat exchanger 11 through the other connecting tube 25B and are cooled. Thereafter the laser gases are repeatedly recycled in the manner outlined.

As shown in FIG. 1 and FIG. 2, a heat exchanger 31 equipped with an air-cooling fan for cooling the inside of the laser generator 1, which is covered by the cover 7, is provided on the side of the connecting tube 25A inside the laser generator 1. This is indicated in more detail in FIG. 3, where it is shown that the air within the cover 7 is made to flow in the direction of the arrows by means of the air-cooling-fan-equipped heat exchanger 31, cooling the inside of the laser generator 1, as well as cooling the laser tube 13 and the support plates 19A and 19B.

The discharge unit 5 is mounted in a removable manner on the support frame 3 and the support plates 19A and 19B. As shown in more detail in FIG. 1 and FIG. 5, each of the tapered flanges 21 which are mounted between the flow control units for the discharge unit 5, and the supporting plates 19A and 19B are mounted and removed by means of a washer 33 for wedging in and pulling out.

Figure 6:
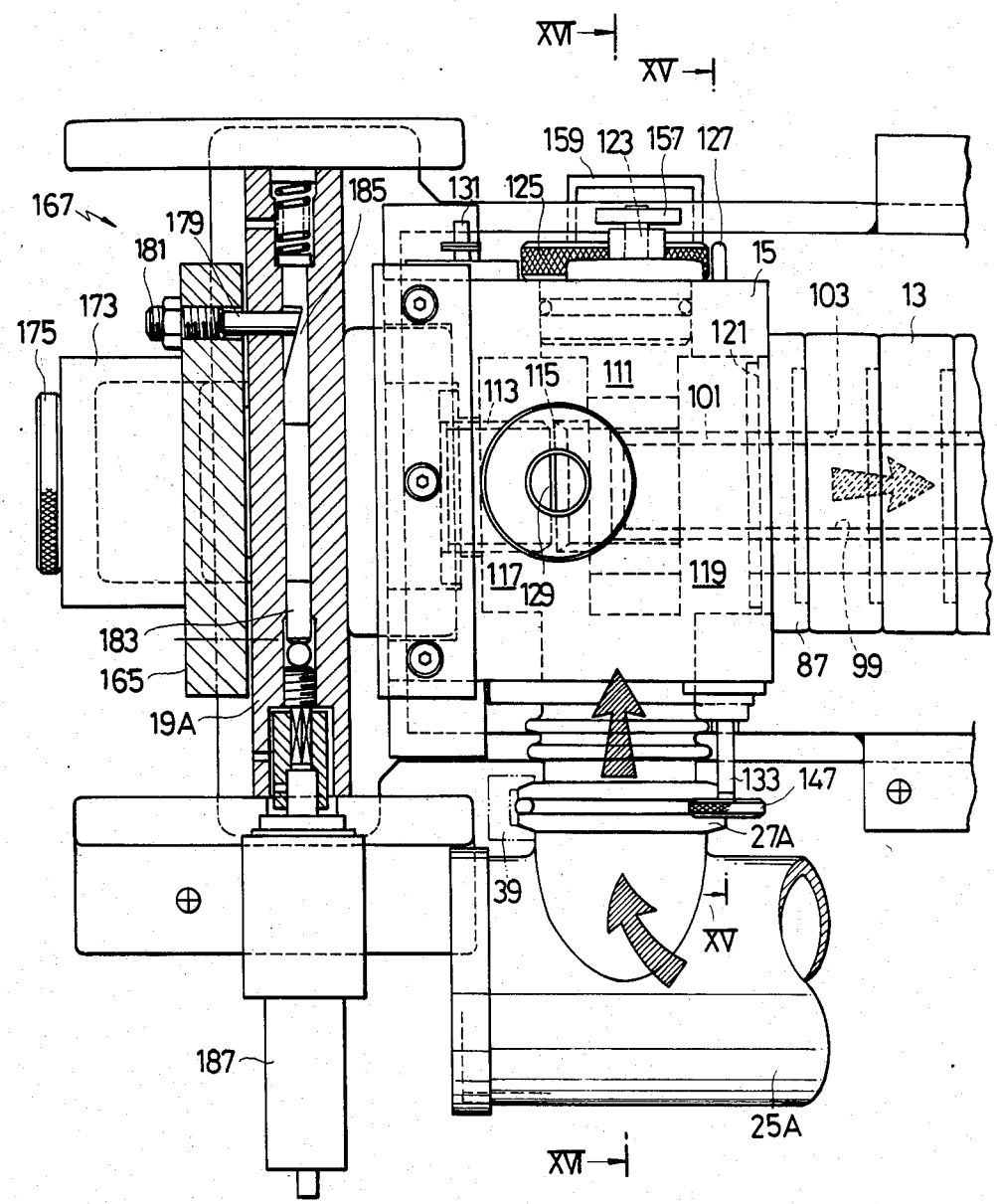
FIG. 6 is an enlarged plan view, viewing along the line VI—VI in FIG. 1, showing one part in sectional view.

A channel base 35 for the discharge unit 5, as shown in FIG. 3, is secured to the support frame 3 by a plurality of bolts 37 in a manner by which it can be mounted or removed. The cylindrical coupling members 27A and 27B, by which the connecting tube 25A is connected to the flow control unit 15, are connected so that they can be mounted or removed by a clamp member 39 with a U-shaped cross-section, as shown in FIG. 6. In addition, the connecting tube 25B is connected to the manifold block 17, in a manner allowing mounting or removal, with a pyrex joint member 41, as shown in FIG. 2.

Accordingly, when removing the discharge unit 5 from the support frame 3, first the tapered flange 21 which is mounted between the support plates 19A, 19B, and the flow control units 15 is removed through the medium of the washer 33 for wedging in and pulling out. Next, the cylindrical coupling members 27A and 27B, by which the flow control units 15 and the connecting tube 25A are connected, are removed by unclamping the clamp member 39. The pyrex joint member 41, which joins the connecting tube 25B and the manifold block 17, is then removed. Finally, the channel base 35 is removed from the support frame 3 by loosening the bolts 37. As a result, as shown in FIG. 4, the discharge unit 5 can be removed from the support frame 3 of the laser generator 1.

As shown in FIG. 4, the discharge unit 5 comprises the channel base 35, the flow control units 15, the manifold block 17, the laser tube 13, a plurality of laser tube supporters 43 which support the laser tube 13, and a plurality of hangers 45 from which the discharge unit 5 is suspended. The control units 15 are mounted on both ends of the channel base 35. The manifold block 17 is mounted at almost dead center of the channel base 35. The laser tube 13 is connected between the flow control units 15 and the manifold block 17. The hangers 45 are erected on the channel base 35 close to the inward faces of the flow control units 15 through a plurality of hanger seats 47. These hangers 45 are used when the discharge unit 5 is being installed on or removed from the laser generator 1, and the removal is carried out by suspending the discharge unit 5 from the hangers 45.

The laser tube supporters 43 are erected on the channel base 35 at both sides of the manifold block 17 to support the laser tube 13. As shown in more detail in FIG. 3, a height adjustment liner 49 is provided on the channel base 35. The height adjustment liner 49 comprises an upper tapered liner 49A and a lower tapered liner 49B. A bolt 51 is inserted through a hole formed in the upper tapered liner 49A and the lower tapered liner 49B. The upper tapered liner 49A is made to slide against the lower tapered liner 49B in the left-right direction in FIG. 3 by rotating the bolt 51 in the clockwise or counterclockwise directions. Accordingly, the height adjustment is performed by causing the tapered face of the lower tapered liner to slide against the tapered face of the upper tapered liner.

The laser tube 13 is mounted on the height adjustment liner 49, and is supported by the laser tube supporter 43. The laser tube supporter 43 comprises a pair of side surface clamp blocks 43A and an upper surface clamp block 43B. An adjustment device 53, which clamps the laser tube 13 with the side surface clamp blocks 43A and the upper surface clamp block 43B in the left-right and up-down directions in FIG. 3, is provided on the upper surface clamp block 43B. An adjustment member 55 which adjusts the clamping of the upper surface clamp block 43B and the right side surface clamp block 43A is mounted on the upper surface clamp block 43B. The tip of the adjustment member 55 points in the upper direction and has a protruding section 55A. The protruding section 55A penetratingly protrudes through an orifice 57 formed in the upper section of the right side of the side surface clamp block 43A and touches the outer side surface of the right side surface clamp block 43A.

The adjustment member 55 is hollow. Furthermore, a support block 61 is provided in which a slot 59 is formed in the upper surface on the right side. An adjustment member 63, which adjusts the left side surface clamp block 43A, is mounted on the hollow section of the support block 61. A slot 65 is formed on the right side section of the adjustment member 63. The support block 61 and the adjustment member 63 are mounted in the slot 65 by a pin 67 installed on the right side section of the support block 61. A tapered section 63A is provided on the left side section of the adjustment member 63 and it penetrates into a hole formed in the upper section of the left side surface clamp block 43A. Further, the top inner surface of a hole formed in the upper section of the left side surface clamp block 43A is tapered to slide along the tapered surface of the tapered section 63A. A screw 69 is installed in the inside of a hole formed at the common position of the support block 61 and the adjustment member 63. A knob 71 is mounted on the upper end of this screw 69.

Accordingly, rotating this knob 71 in either the clockwise or the counterclockwise directions causes the screw 69 to rotate. When the screw 69 is tightened, the left end of the adjustment member 63 slides in the upper direction in FIG. 3, and the tapered section 63A of the adjustment member 63 touches the upper surface tapered section of the hole formed in the left side surface clamp block 43A, and secures the left side surface clamp block 43A. In addition to securing the left side surface clamp block 43A, the tip of the screw 69 also applies pressure against the adjustment member 55. If the screw 69 is tightened further, the protruding section 55A at the tip of the adjustment member 55 is pulled by the component of the force in the horizontal direction acting on the tapered section 63A of the adjustment member 63. As a result, the protruding section 55A presses against the outside surface of the right side surface clamp block 43A so that force is applied to the inside to clamp the laser tube 13 in place.

Then, through the action of the force in the direction of the arrow F as indicated in FIG. 3, the laser tubes 13 are supported in all four directions. At that time, a notch 73 provided in the lower direction of the left and right side surface clamp blocks 43A plays the role of neutralizing an extreme force F applied to the left and right of the side surface clamp blocks 43A, or a shock. As discussed, the laser tube supporter 43 comprising the side surface clamp blocks 43A and the upper surface clamp block 43B protect the laser tubes 13 during shipment.

As is clearly seen in FIG. 4, a preionization resistor holder 75 which can be an insulated unit which houses a high resistance resistor 77 is provided on the upper section of the manifold block 17. An insulated acrylic cover 79 is fitted on its upper section. One end of the high resistance resistor 77 is connected to the channel base 35 by a high voltage cable 81, while the other end is connected to the manifold block 17 with the high voltage cable 81. In this way, when a high voltage is applied to a cathode ring 83 housed in the laser tube 13 a glow discharge is produced between the cathode ring 83 and the manifold block 17, and the value of the current carries out a preionization of several milliamperes.

As has already been explained with reference to FIG. 4, the laser tubes 13 are connected between the flow control units 15 and the manifold block 17. Next, the detailed configuration of the laser tubes 13 will now be explained with reference to FIG. 5 and FIGS. 7 to 14. The left and right laser tubes 13 are either identical or mirror images. Therefore the explanation will be made with reference to the left laser tube 13 shown in FIG. 5 and the explanation of the right laser tube 13 will be omitted.

As shown in FIG. 5, a plurality of, for example, four insulated studs 85 are mounted on one side surface of the flow control unit 15, and these studs 85 act to combine a gas flow separator block 87, a plurality of first stage disks 89, a plurality of second stage disks 91, a blind disk 93, a cathode plate 95, and a press flange 97 in that order, into an integral laminated structure.

As shown in FIG. 5 and FIG. 7, the gas flow separator block 87 is made of ceramic. A main hole 99 is formed in the shaft center section, and a cylindrical protruding section 101 which protrudes toward the flow control unit 15 is provided at the outer wall of the main hole 99. A plurality of, for example, four sub-holes 103 are formed around the circumference of the base of the protruding section 101. In addition, a plurality of studbolt holes 105 are provided to be penetrated by the insulated studs 85 at, for example, the four corners. Accordingly, the gas flow separator block 87 can be mounted on one side surface by means of the plurality of insulated studs 85. The laser gases flow from the control unit 15 through the main hole 99 and the sub-holes 103.

As shown in FIG. 5 and FIG. 8, the first stage disk 89 is made of ceramic in the same way as the gas flow separator block 87, and, in addition, four studbolt holes 105 are formed, for example, in the four corners. Also the main hole 99 and the sub-holes 103 are formed on the first stage disk 89, in the same way and of the same diameter as on the gas separator block 87. A gas injection section in the form of a gas injection channel 107 which injects the gases in the tangential direction is formed between the outer circumference of the one main hole 99 and the four sub-holes 103, and is connected to them. Further, so that the conductance in a second stage disk 91, which will be later discussed, will not become small, the diameter of the sub-hole 103 of the first stage disk is made larger than the diameter of the sub-hole 103 of the second stage disk 91.

Accordingly, a plurality of insulated studs 85 are inserted from the stud holes 105 into the first stage disks 89, making a plurality of laminations with the gas flow separating block 87. The laser gases flow from the main hole 99 of the flow separator block 87 into the main hole 99 of the laminated first stage disks 89. Also, the laser gases flow from the sub-hole 103 of the flow separator block 87 into the sub-holes 103 of the laminated first stage disks 89, and are injected from the gas injection channels 107 in the tangential direction of the main hole 99, and the velocity of the gases close to the inner wall of the laser tube is increased, so that a homogeneous velocity distribution is obtained.

As shown in FIG. 5 and FIG. 9, the second stage disks 91 are constructed almost the same as the first stage disks 89 so a detailed explanation of the construction will be omitted. However, the laminated second stage disks 91 differ from the first stage disks 89 inasmuch as the diameter of the subhole 103 is smaller than that of the subhole 103 of the first stage disks 89 so that the cross-sectional area is smaller, so that the velocity of the laser gases is homogeneously augmented.

Now referring to FIG. 5 and FIG. 10, a blind disk 93 is made of ceramic and the studbolt holes 105 which are penetrated by the insulated studs 85 are formed in the four corners. The main holes 99 are formed in the shaft center section and the subholes are blocked off.

Now referring to FIG. 5 and FIG. 11, the cathode plate 95 is made of stainless steel, and a nickel cathode ring 83 is pressed into the inner diameter section. A high voltage is applied to the cathode ring 83. The studbolt holes 105 for inserting the insulated studs 85 are formed in the four corners in the same way as for the other disks discussed up to this point. The cathode plate 95 is interposed between the blind disk 93 and the press flange 97 forming a laminated unit.

Now referring to FIG. 5 and FIG. 12, the press flange 97 acts a guide for the four insulated studs 85, and by tightening the studs 85, an integrated laminated laser tube is formed by pressing these disk types together. On this press flange 97, a cylindrical protruding section is formed which is inserted in the holes formed in the manifold block 17.

Now referring to FIG. 13 and FIG. 14, a heat sink 109 is fastened, for example, by the use of epoxy adhesive, to the outer circumferential section of the first stage disk 89 and the second stage disk 91, actively cooling the disk itself for improved cooling. With the above construction, the length of the laser tube can be arbitrarily adjusted by setting a suitable number of laminations for the first stage disks 89 and the second stage disks 91.

An explanation of the specific construction of the left and right flow control units 15 mounted on both ends of the discharge base 35 of the discharge unit 5, will be given here. However, because they are identical or mirror images, the explanation of the right flow control unit 15 is omitted.

Now referring to FIG. 5 and FIG. 6, the laser gases in the connecting tube 25A are fed through the coupling member 27A in the direction of the arrow on the flow control unit 15. A ceramic cylindrical flow control valve 111 and an anode ring 113 are provided, opposed to the axial direction of the laser tube 13, in the flow control unit 15. The protruding portion 101 of the gas flow separation block 87 of the laser tube 13 is inserted almost as far as the center of the flow control valve 111 provided inside the flow control unit 15. An annular space 115 is formed between the flow control valve 111 and the anode ring 113, and the laser gases are injected in the direction shown by the arrow from the annular space 115 to the main hole 99 side of the laser tube 13. The flow control valve 111, fitting into the flow control unit 15, is suitably mounted on a support section formed almost at the center of the flow control unit 15. A first gas chamber 117 and a second gas chamber 119, which are suitably connected to the connecting tube 25A, are formed on both sides of this support section. The flow control valve 111 and the anode ring 113 are positioned in opposition, in the first gas chamber 117. The protruding section 101 of the gas flow separation block 87 is extendingly inserted into the flow control valve 111. Accordingly, the laser gases are fed through the connection tube 25A and the cylindrical coupling member 27A into the first gas chamber 117. The laser gases which are fed into the first gas chamber 111 flow uniformly in the direction of the arrows from all around the annular space 115 formed between the flow control valve 111 and the anode ring 113 into the main hole 99 of the laser tube 13.

The laser gases from the flow control unit do not flow into the laser tube 13 at right angles, as in conventional tubes, but flow from all around the annular space 115 as uniformly as possible into the main hole 99 to the inside of the laser tube 13. For this reason, the laser beam output mode is improved by the reduction of fluctuation of the laser gases, and when this equipment is used in a laser process, the degree of roughness of the surface of the workpiece is much better than obtained conventionally.

Furthermore, the second gas chamber 119 is suitably connected to the sub-holes 103 of the laser tube 13. Accordingly, the laser gases fed through the connection tube 25a and the cylindrical coupling member 27A flow into the second gas chamber, and the laser gases which flow into the second gas chamber 119 are caused to flow through the sub-holes 103 of the laser tube 13 into the main hole 99.

Figure 15:
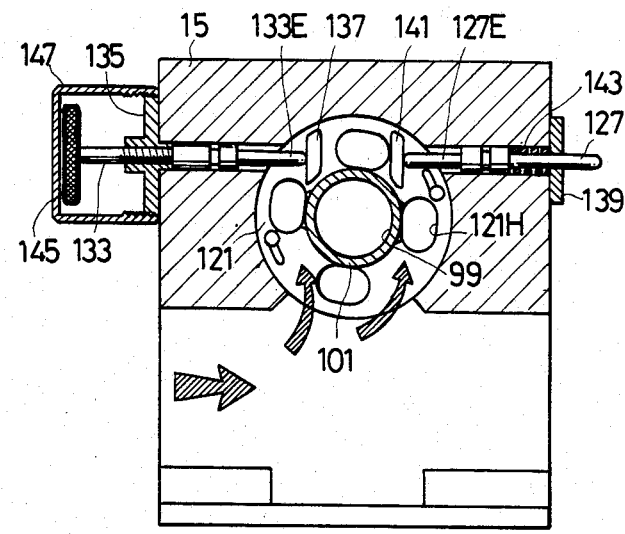
FIG. 15 is a sectional drawing, viewing along the line XV—XV in FIG. 6.
Figure 16:
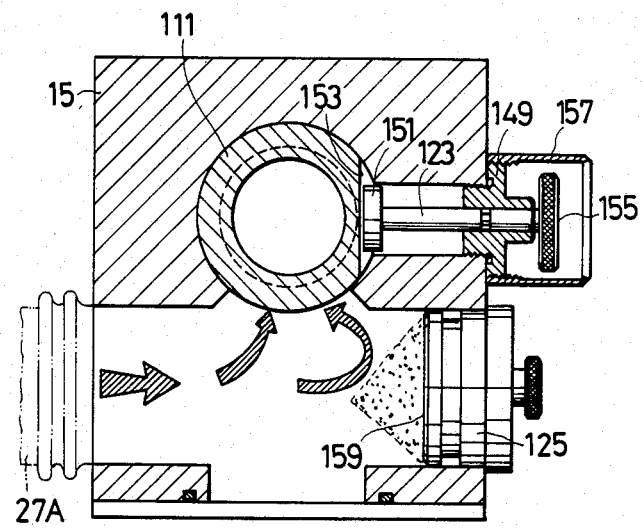
FIG. 16 is a sectional drawing, viewing along the line XVI—XVI in FIG. 6.

In FIG. 5 and FIG. 6, and as shown in FIG. 15 and FIG. 16, a sub-flow control valve 121 which controls the volume of flow into the sub-holes 103 in the flow control unit 15, and a main flow control shaft 123 which controls the previously explained flow control valve 111, are provided. In addition, a dust trap cap 125 for use as a dust trap, and a rod 127 for checking the degree of opening of the subcontrol valve 121, a window 129 for checking the degree of opening of the flow control valve 111, and a power supply stud 131 for providing power, are provided in the flow control unit 15.

The control of the flow of laser gases to the sub-hole 103 is carried out by adjusting a cylindrical sub-flow control valve 121 provided with a plurality of holes 121H which adjust the sub-holes 103 by throttling. More specifically, as is clearly indicated in FIG. 15, an operating rod 133, which provides the rotary action of the sub-flow control valve 121 on one side surface of the flow control unit 15, is screwed onto a disk-shaped support block 135. The tip section 133E of the operating rod 133 contacts an adjustment block 137 which is mounted in the sub flow control valve 121. On the other side surface, which is in the opposite direction of the flow control unit 15· which removably supports the operating rod 133, the rod 127, which is used to check the degree of opening of the sub flow control valve 121, is removably supported by a support block 139 so that it may freely enter and exit. This valve opening check rod 127 is inserted into a hole formed in the flow control unit 15. Its tip section 127E contacts an adjustment block 141 which is mounted on the sub flow control valve 121. A spring 143 is installed within a hole formed in the flow control unit 15, and is usually energized toward the tip section 127E of the valve opening check rod 127.

Then by rotating a knob 145 provided on the operating rod 133 in the clockwise or counter clockwise direction, the tip section 133E of the operating rod 133 applies pressure against the adjustment block 137, and, in addition, rotary action is applied to the adjustment block 137 and the sub flow control valve 121 rotates. The cross sectional area of a throughhole into the sub-hole 103 is continuously throttled through the rotation of the sub control valve 121, and the volume of flow of the laser gases passing through the subhole 103 is adjusted. With the rotation of the sub flow control valve 121, the tip section 127E of the valve opening check rod 127 resists the energy of the spring 143. Pressure is applied to the adjustment block 141 and the valve opening check rod 127 moves in the outward direction. By viewing this action the adjustment of the subflow control can be checked.

A protective cap 147 is screwed into the outer surface of the disk-shaped support block 135 to prevent unauthorized manipulation of the knob 145 provided on the operating rod 133, after the adjustment of the sub flow control.

The volume of flow of the laser 9ases to the main hole 99 is controlled by moving the main control shaft 123 in the axial direction of the flow control valve 111. More specifically, as is clearly indicated in FIG. 16, the main flow control shaft 123 on one side surface of the flow control unit 15 is removably supported on the disk-shaped support block 149. The main flow control shaft 123 extends into a hole formed in the support block 149, facing in the rear direction of the part removably supported on the flow control unit 15. A cam 151 is mounted on one end of the main flow control shaft 123. The cam 151 is positioned in a channel 153 in formed the flow control valve 111, so that the flow control valve 111 can be moved forward and backward in the axial direction. Accordingly, by rotating a knob 155 on the other end of the main flow control shaft 123 in the clockwise or counterclockwise direction, the tip of the cam 151 moves back and forth in the axial direction so the space 115 is adjusted, thus adjusting the volume of flow of the laser gases to the main hole 99. Also, a cap 157, which screws onto the disk-shaped support block 149, completely encloses the knob 155 and prevents any unauthorized handling.

In order to fill the dust trap function, the dust trap 125 is installed on the flow control unit 15. More specifically, as clearly indicated in FIG. 16, the dust trap cap 125 is mounted on the side surface of the flow control unit 15 opposite from the cylindrical coupling member 27A. Silicone grease 159 is applied to the inside surface of the dust trap cap 125 to adsorb dust. Accordingly, because the laser gas flow from the coupling unit 27A to the flow control unit 15 is deflected 90 degrees, the fine particles of dust are removed through the difference in inertia between the gases and the fine particles of dust. These fine particles travel straight ahead from inertia and are adsorbed on the silicone grease on the inside of the dust cap 125, while the lighter laser gases head upward to be injected. As a result, delicate parts such as the output mirror are protected from dust.

The main flow control opening check window 129 is installed on the top surface of the flow control unit 15.

More specifically, as clearly indicated in FIG. 5 and FIG. 6, the check window 129, made of transparent acrylic, is installed on the upper surface of the flow control unit 15 for checking the degree of opening of the control unit. An orifice 161 is formed in one section of the flow control unit 15, opening into the first gas chamber 117 formed in the flow control unit 15. The inside of the flow control unit 15 can be observed through the check window 129.

Accordingly, the space 115 between the anode ring 113 and the flow control valve 111 can be observed and checked through the check window 129, so that the adjustment of the flow control valve 111 by means of the main flow control shaft 123 can be easily checked.

The power supply stud 131 is installed on the flow control unit 15 to supply power to the anode ring 113. The power supply stud 131 extends into an orifice formed in the flow control unit 15 and its tip is stopped at the anode ring 113 by a stopper fitting. The flow control unit 15 itself is electrically insulated so that power is fed to the anode ring 113 by the power supply stud 131.

Now referring to FIG. 1 and FIG. 2, an output mirror assembly for resonant amplification of the excited beam which is excited by the electrical discharge inside the laser tube 13 is supported by the support plate 19A. A rear mirror assembly is supported by the support plate 19B. More specifically, as clearly indicated in FIG. 5 and FIG. 6, a stepped hole 163 is formed in the axial direction opposed to the main hole 99 of the laser tube 13, matching with the inside of the support plate 19A. A mirror holder 165 is mounted in the stepped hole 163, and the output mirror assembly 167 is removably supported in the mirror holder 165.

The output mirror assembly 167 comprises an inner ring member 171 which supports an output mirror 169, an outer ring member 173, and a fixed ring member 175. An annular cooling chamber 177 is formed between the inner and outer ring members 171 and 173. A cooling medium, such as water, flows freely through this annular cooling chamber 177 to cool the output mirror 169. One part of the mirror holder 165 is inset and supported in a freely rotating manner through a ball joint or similar device so that the mirror holder 165 can swing in the forward and backward direction for adjustment of its angle. Now referring again to FIG. 5 and FIG. 6, a pin 179 is inserted into a hole formed in the support plate 19A and the mirror holder 165, and is adjusted by means of an adjustment bolt 181. The angled tip of the pin 179, as shown in FIG. 6, contacts a wedge 185 formed in one section of the shaft 183 which is fitted into the support plate 19A. A screwed member, suitably connected to one end surface of the shaft 183, mates through a spline with the output shaft of a control motor 187, which may be a servomotor.

When the control motor 187 is driven, the shaft 183 moves in the upward and downward direction in FIG. 6. The pin 179 is caused to move upward and downward in the axial direction by the movement of the shaft 183. The mirror holder 165 is made to swing by the forward and backward movement of the pin 179, and the angle of the output mirror 169 is thus adjusted.

The construction of the rear mirror assembly is almost the same as that of the output mirror assembly, so a detailed description is omitted here.

In the present invention, a first gas chamber is formed which communicates with a laser introduction port in a flow control unit positioned at one end of a laser tube in a laser generator. One end of this laser tube is provided opening in the first gas chamber. A ring member provided in the first gas chamber corresponding to one end of the laser tube and a cylindrical flow control valve are provided facing in the axial direction. In addition, an orifice is formed between the ring member and the flow control valve to adjust the flow volume of the laser gases going to the laser tube, and provision is made for freely adjusting the ring member and the flow control valve in a suitable direction in the axial direction.

In addition, a first and second gas chamber are formed and provided in a flow control unit positioned at one end of the laser tube for the laser generator, to communicate with a laser introduction port with one end of the laser tube opening in the first gas chamber, and an orifice is formed between the ring member and the flow control valve for adjusting the flow volume of the laser gas going to the laser tube. It is possible to freely adjust the ring member or the flow control valve in a suitable direction in the axial direction. A communication hole for communicating with a plurality of laser injection holes formed in the longitudinal direction in the laser tube is provided to communicate with the second gas chamber. Because this communication hole is provided with a throttling valve for free throttling adjustment, compared with conventional units the fluctuations of the gas flow become extremely small and the distribution of the intensity of the output beam is made homogeneous. As a result, the roughness of the surface of the workpiece being processed is improved.

By laminating ceramic disks having a main hole and a communication hole to form the laser tube of the present invention, the construction of the laser tube is simplified.

In the present invention, it is possible to control the main flow and the sub-flow for the injection of the laser gases into the main flow, so that good conditions are obtained for the homogeneity of the velocity distribution of the laser gases and the stabilization of the beam.

In the present invention, by the provision of an inspection window and a checking unit in the flow control unit, it is possible to check from outside whether the adjustment of the flow control valve and the sub-flow control valve is being reliably performed.

In addition, in the present invention, the dust included in the laser gases can be eliminated by providing a dust trap unit in the flow control unit.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A flow control device for a laser generator having a laser tube with one end section for receiving laser gas and having a laser introduction port for introducing laser gas to said end section for receiving laser gas comprising:

a flow control unit positioned at the end section for receiving laser gas of the laser tube;

a first gas chamber formed in the flow control unit to communicate between said laser introduction port and said end section for receiving laser gas;

a ring member and a cylindrical flow controller valve provided in said flow control unit opposing each other in the axial direction of the flow of laser gas in the laser tube;

an orifice formed between the ring member and the flow controller valve to adjust the flow volume of the laser gases going to the laser tube; and wherein one of the ring member and the flow control valve can be adjusted in the axial direction of the flow of laser gases in the laser tube.

2. The flow control device for the laser generator of claim 1 wherein: the laser tube is formed from ceramic disks laminated together, each of said disks having a main hole for the flow of laser gas therethrough and a sub-hole for the flow of laser gas therethrough.

3. The flow control device for the laser generator of claim 1 wherein: an inspection window is provided in the flow control unit to check the adjustment of the flow control valve.

4. The flow control device for the laser generator of claim 1 wherein: a dust trap unit is provided in the flow control unit to exclude dust contained in the laser gases.

5. A flow control device for a laser generator having a laser tube with one end section for receiving laser gas through a main hole and a sub-hole and having a laser introduction port for introducing laser gas to said end section for receiving laser gas comprising:

a flow control unit positioned at the end section for receiving laser gas of the laser tube;

a first and a second gas chamber formed in the flow control unit to communicate with the laser introduction port;

the end section for receiving laser gas of the laser tube provided opening into the first gas chamber;

a ring member and a cylindrical flow controller valve provided in the flow control unit opposing each other in the axial direction of the flow of laser gas in the laser tube;

an orifice formed between the ring member and the flow controller valve to adjust the flow volume of the laser gases going to the laser tube;

said ring member and said flow controller valve being freely adjustable relative to one another in the axial direction;

said second gas chamber communicating with said sub-hole in the laser tube; and a throttling valve provided between the second gas chamber and the laser tube to freely adjust the flow of laser gas passing through the sub-hole by throttling.

6. The flow control device for the laser generator of claim 5 wherein; the laser tube is formed from ceramic disks laminated together, each of said disks having a main hole and a sub-hole.

7. The flow control device for the laser generator of claim 5 wherein; a degree-of-opening check unit for checking the adjustment of a sub-flow control valve is provided in the flow control unit.

8. A flow control unit for a laser generator having a laser tube with a main hole for the passage therethrough of a main flow of laser gas, said laser generator further having an inlet port for the supply of laser gas to said laser tube comprising:

a ring member disposed in said flow control unit in the direction of axial flow of laser gas in the laser tube;

a flow control valve disposed in said flow control unit opposite said ring member in the direction of axial flow of laser gas in the laser tube, said flow control valve communicating with the main hole of the laser tube to allow passage of laser gas into said laser tube;

an orifice formed between said ring member and said flow control valve and communicating with the inlet port to supply laser gas through said orifice; and means to move said flow control valve relative to said ring member to vary the size of said orifice to thereby control the main flow of laser gas from said inlet port to said laser tube.

9. The flow control unit of claim 8 wherein the orifice communicates with the inlet port by means of a first gas chamber disposed in said flow control unit.

10. The flow control unit of claim 9 wherein the flow control valve is mounted for axial movement toward and away from the ring member and the means to move the flow control valve relative to the ring member comprises a cam mounted for rotation on the flow control unit and a channel formed in the flow control valve, said cam positioned in said channel so as to axially move said flow control valve toward and away from said ring member when said cam in rotated.

11. The flow control unit of claim 10 wherein an inspection window is provided in the flow control so as to permit visual inspection of the displacement of the flow control valve relative to the ring member.

12. The flow control unit of claim 11 further comprising a dust trap disposed in said flow control unit opposite said inlet port.

13. The flow control unit of claim 9 wherein said laser tube is further provided with a sub-hole for the passage therethrough of a sub-flow of laser gas further comprising:

a second gas chamber formed in said flow control unit, said second gas chamber communicating between said sub-hole and said inlet port;

means disposed in said second chamber for throttling the flow of gas from said inlet port to said sub-hole.

14. The flow control unit of claim 13 wherein the throttling means comprises a cylindrical sub-flow control valve mounted for rotation in said flow control unit, said cylindrical sub-flow control valve having a hole adapted to be aligned with said sub-hole, an adjustment block mounted on said sub-flow control valve, and an operating rod threaded on the flow control unit and abutting the adjustment block whereby the operating rod may be selectively rotated to move the adjustment block to rotate the sub-flow control valve thereby aligning the sub-flow control valve hole and laser tube sub-hole to throttle the flow of laser gas therethrough.

15. The flow control unit of claim 14 further comprising a degree-of-opening check unit connected with said sub-flow control valve to provide visual inspection of the rotation of the sub-flow control valve.

* * * * *